(12) United States Patent
Streit et al.

(10) Patent No.: US 10,479,727 B2
(45) Date of Patent: Nov. 19, 2019

(54) METHOD FOR OPERATING A PLANT FOR PRODUCING CEMENT

(71) Applicant: KHD Humboldt Wedag GmbH, Cologne (DE)

(72) Inventors: Norbert Streit, Siegburg (DE); Marc Feiss, Cologne (DE)

(73) Assignee: KHD Humbolt Wedag GmbH, Köln (DE)

( * ) Notice: Subject to any disclaimer, the term of this patent is extended or adjusted under 35 U.S.C. 154(b) by 554 days.

(21) Appl. No.: 14/782,400

(22) PCT Filed: Apr. 4, 2014

(86) PCT No.: PCT/EP2014/056777
§ 371 (c)(1),
(2) Date: Oct. 5, 2015

(87) PCT Pub. No.: WO2014/166822
PCT Pub. Date: Oct. 16, 2014

(65) Prior Publication Data
US 2016/0039714 A1 Feb. 11, 2016

(30) Foreign Application Priority Data
Apr. 11, 2013 (DE) .................. 10 2013 006 237

(51) Int. Cl.
C04B 7/36 (2006.01)
C04B 7/44 (2006.01)
C04B 7/43 (2006.01)
(52) U.S. Cl.
CPC .............. *C04B 7/365* (2013.01); *C04B 7/432* (2013.01); *C04B 7/4446* (2013.01)

(58) Field of Classification Search
CPC ......... C04B 7/364; C04B 7/365; C04B 7/432; C04B 7/4446
See application file for complete search history.

(56) References Cited

U.S. PATENT DOCUMENTS 4,678,514 A 7/1987 Deyhle et al.
4,747,879 A 5/1988 Wolter et al.
(Continued)

FOREIGN PATENT DOCUMENTS

CN 102260051 A 11/2011
CN 102967145 A 3/2013
(Continued)

OTHER PUBLICATIONS

International Search Report, dated Jun. 27, 2014.

*Primary Examiner* — Shuangyi Abu Ali
(74) *Attorney, Agent, or Firm* — Greer, Burns & Crain, Ltd.

(57) ABSTRACT

A method for operating a plant for producing cement clinker from raw meal having, as viewed in the materials flow direction, at least one calciner for deacidifying the raw meal, and at least one rotary kiln for sintering the deacidified raw meal to form cement clinker. The deacidified raw meal, after passing through the calciner, flows via a cyclone preheating stage into the rotary kiln. Exhaust gases are guided from the rotary kiln into a reactor, arranged between the rotary kiln and the calciner, with fuel being fed into the reactor super-stoichiometrically in relation to the dwell time of the exhaust gases in the reactor, so that carbon dioxide in the exhaust gases is reduced to form carbon monoxide. The carbon monoxide is used as a reducing agent for nitrogen oxides, which are chemically reduced in the reactor independently of the short dwell time in the calciner.

7 Claims, 1 Drawing Sheet

(56) References Cited

U.S. PATENT DOCUMENTS

| | | |
|---|---|---|
| 6,287,110 B1 | 9/2001 | Ramesohl et al. |
| 6,447,598 B2 | 9/2002 | Kuhnke et al. |
| 6,544,032 B1 | 4/2003 | Brentrup |
| 6,626,662 B2 | 9/2003 | Ramesohl et al. |
| 2002/0071801 A1 | 6/2002 | Eckert et al. |
| 2007/0234940 A1 | 10/2007 | Thomsen |
| 2010/0050906 A1 | 3/2010 | Schuermann et al. |

FOREIGN PATENT DOCUMENTS

| | | | |
|---|---|---|---|
| DE | 3320670 | | 12/1984 |
| DE | 3411144 | | 10/1985 |
| DE | 3520447 | | 12/1986 |
| DE | 3533775 | | 3/1987 |
| DE | 3538707 | | 5/1987 |
| DE | 19903954 | | 8/2000 |
| DE | 19962536 | | 7/2001 |
| DE | 102005057346 | | 6/2007 |
| EP | 1180501 | | 2/2002 |
| EP | 1334954 | | 8/2003 |
| JP | S5742320 A | | 3/1982 |
| JP | S6161129 U | | 4/1986 |
| JP | 2004205064 A | | 7/2004 |
| WO | 0155048 | | 8/2001 |
| WO | 2005108892 | | 11/2005 |
| WO | 2008120109 | | 10/2008 |
| WO | WO2008120109 | * | 10/2008 |

* cited by examiner

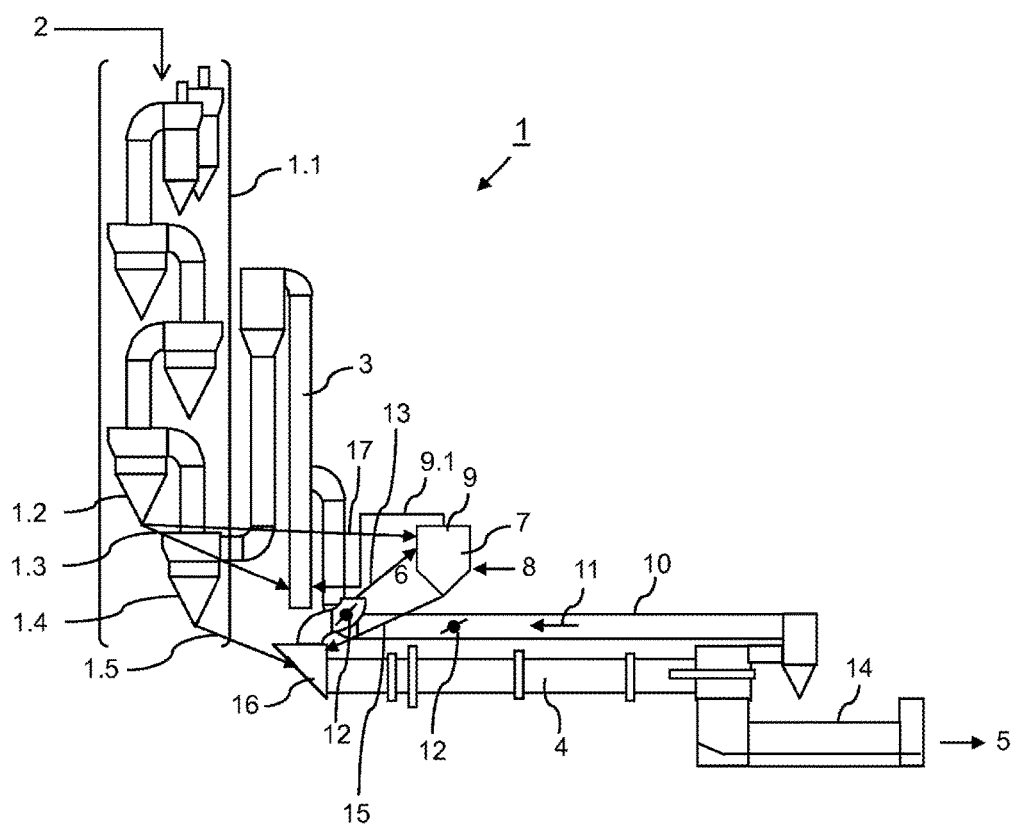

METHOD FOR OPERATING A PLANT FOR PRODUCING CEMENT

CROSS-REFERENCES TO RELATED APPLICATIONS

This application claims the benefit of the German patent application No. 102013006237.3 filed on Apr. 11, 2013, disclosures of which are incorporated herein by way of reference.

BACKGROUND OF THE INVENTION

The invention relates to a method for operating a plant for producing cement clinker from raw meal having, viewed in the material flow direction, at least one calcinator for deacidifying the raw meal, and at least one rotary kiln for sintering the deacidified raw meal to form cement clinker, wherein the deacidified raw meal, after passing the calcinator, flows via a cyclone preheating stage into the rotary kiln.

To produce cement clinker, a mixture of calcareous rock and silicate-containing rock is ground and subjected to a heat treatment, during which the limestone is formally freed of carbon dioxide ($CO_2$) and converted into burnt lime ($CaO$). In a further stage, the raw meal, which is deacidified by being freed from $CO_2$, and which consists of the deacidified calcareous rock and the silicate-containing rock, which is still unchanged up to this point, is sintered in the heat to form various calcium silicate phases.

The deacidification and also the sintering of raw meal are endothermic processes, which require thermal energy for their reaction. This thermal energy can be obtained from high-quality fuels. In addition to the classical primary fuels, for example, coal, alternative fuels, which are frequently obtained from municipal or industrial wastes, are increasingly used as energy carriers in cement plants for reasons of cost.

Both the high-quality fuels and also the alternative fuels result in the formation of nitrogen oxides (NOx) during the combustion to supply the processing heat. The type of the thermal treatment mentioned at the outset makes it necessary for the sintering to be performed in a rotary kiln, wherein very high temperatures of at least 1450° C. must prevail in the rotary kiln for successful sintering of the calcium silicate phases. To generate these high temperatures in the rotary kiln, flame temperatures which reach up to 1800° C. are indicated. At the high temperature, both nitrogen occurring in the fuel, usually in the form of amines, and also air nitrogen occurring in the combustion air, are combusted to form nitrogen oxides (NOx). If no measures are taken to avoid or reduce the occurring nitrogen oxides, the nitrogen oxides escape with the exhaust air of the rotary kiln into the free atmosphere, where they are converted by hydrolysis with the ambient humidity to form nitric acid ($HNO_3$), nitrous acid ($HNO_2$), and other acidically reactive nitrogen oxide hydrates. The nitrogen oxides (NOx) which acidically react with ambient humidity are the primary cause of undesired acid rain, which decreases the natural pH value of forest soil and weakens its resistance to illnesses. Various measures are known for reducing the emission of nitrogen oxides (NOx) from plants for producing cement.

A plant for producing cement, which has, in addition to the calcinator, a combustion chamber, which is fed with tertiary air as combustion air, is disclosed in German published application DE 10 2005 057 346 A1. The reduction properties of the exhaust gases produced in the combustion chamber can be set very precisely in the plant disclosed therein, to reduce the nitrogen oxides originating from the rotary kiln in the calcinator in the calcinator section. The method disclosed therein has the disadvantage that the deacidification of the raw meal in the calcinator, on the one hand, and the reduction of nitrogen oxides also in the calcinator, on the other hand, find their desired chemical equilibrium at different temperatures. The deacidification and the reduction of nitrogen oxides mutually interfere with one another.

A skein calcinator is disclosed in German published application P 35 38 707 A1, which has two reaction sections in the form of gas skeins, which rise adjacent to one another within the calcinator, of which a first gas skein flows from the rotary kiln into the calcinator and a gas skein adjacent thereto flows from a second infeed of the tertiary air into the calcinator. The gas skeins have different reduction potentials and the gas skein from the tertiary air is to reduce the nitrogen oxides in the gas skein from the rotary kiln. According to the teaching described therein, a relatively short time is available for burning out the nitrogen oxides, so that the requirement for the control of the flow conditions within the calcinator is very high. Since the flow conditions in the calcinator can vary in the event of slight changes of the operating parameters, this operating mode is not always in the optimal state.

A principle similar thereto is disclosed in German published application DE 199 03 954 A1, wherein a reactor for setting the redox potential of the gases to be generated is present in the tertiary air section. This operating mode also places a high demand on the control of the flow conditions in the calcinator. Since the flow conditions in the calcinator can also vary in the event of slight changes of the operating parameters in this plant, this operating mode is also not always in the optimal state.

A calcinator having top air supply is disclosed in German published application DE 199 62 536 A1. In this calcinator, a staged combustion is carried out, during which nitrogen oxide (NOx) is reduced by carbon monoxide (CO) formed inside the combustion section. To improve the nitrogen oxide reduction while simultaneously avoiding carbon monoxide in the exhaust gas of the plant, it is proposed that a reducing agent and/or a catalyst be injected in dependence on the measured exhaust gas parameters in the calcinator section.

A rotary kiln is disclosed in EP 1 334 954 B1, which, in addition to the rotary kiln, which is already provided for the clinker firing, of a plant for producing cement, carbonizes coarse, lumpy fuel. The pyrolysis gases and the hot air generated by the carbonization are blown into the calcinator, to thus assist the heat supply for the deacidification carried out in the calcinator. With correspondingly little air supply, the carbonization gases have a reductive effect and can be used for reducing the nitrogen oxides in the calcinator, which originate therefrom. However, the operation of a second rotary kiln is linked to a high structural expenditure and requires continuous monitoring of the mechanism, which is always hot in operation.

A plant for producing cement clinker from raw meal with utilization of waste materials having a high caloric value is known from DE 35 33 775 C1, in which waste materials used as a secondary fuel are thermally treated after their drying in a carbonization furnace, which is operated with rotary kiln exhaust gas and a partial stream of the tertiary air, for pyrolysis, but at least for partial combustion. The pyrolysis gas of this combustion is introduced into the calcinator and the solid pyrolysis residues are at least partially introduced into the rotary kiln after their preparation and homogenization. The carbonization furnace can also be implemented as a rotary kiln in this case.

In a plant for producing cement clinker with utilization of waste materials having a high caloric value, carbonizing or combusting the waste materials in a separate rotary kiln and using the carbonization gas/exhaust gas during the thermal raw meal treatment is also known from DE-A-33 20 670, DE-A-34 11 144, and DE-A-35 20 447.

All previously known plants and the methods embodied therein are directed to a chemical reduction of the rotary kiln exhaust gases in the calcinator in the presence of the raw meal to be deacidified, however, with the disadvantages mentioned at the outset of the short dwell time, the interfering deacidification reaction, and the high demands on the control of the flow conditions. The temperature windows, which are required for the different reactions occurring simultaneously in the calcinator and nearly at the same location, are difficult to produce. The deacidification of the calcium carbonate ($CaCO_3$) contained in the raw meal to form burnt lime (CaO) occurs at lower temperatures than the ideal temperature window for the denitrification during the staged combustion. Finally, the temperature window for the generation of carbon monoxide (CO) is in turn different from that for denitrification.

It is known that the denitrification, i.e., the reduction of nitrogen oxides (NOx) to form elementary nitrogen ($N_2$) and oxygen ($O_2$), is dependent on the further gas composition in the exhaust gas to be denitrified. The denitrification decreases rapidly with rising $CO_2$ concentration. In contrast, the denitrification increases with a rising concentration of carbon monoxide (CO) in the exhaust gas to be denitrified. The concentration of ($CO_2$) and (CO) are in the Boudouard equilibrium in a hot exhaust gas. Better control of the exhaust gas composition of the rotary kiln, which has a high nitrogen oxide component, so-called air nitrogen, due to the high combustion temperature, would be desirable. The exhaust gases of the rotary kiln are not immediately discarded, but rather used for the deacidification of the raw meal.

SUMMARY OF THE INVENTION

The object of the invention is therefore to provide a method for operating a plant for producing cement, in which the denitrification can be controlled better.

The method object according to the invention is achieved by guiding of the exhaust gases of the rotary kiln into a reactor, which is arranged between rotary kiln and calcinator, wherein superstoichiometric fuel is fed into the reactor in relation to the dwell time of the exhaust gases in the reactor, so that carbon dioxide ($CO_2$) contained in the exhaust gases is reduced to form carbon monoxide (CO).

Further advantageous embodiments are specified in the dependent claims to method claim 1.

According to the invention, a method for operating a plant for producing cement clinker from raw meal is proposed, having, viewed in the material flow direction, at least one calcinator for deacidifying the raw meal, and at least one rotary kiln for sintering the deacidified raw meal to form cement clinker, wherein the deacidified raw meal, after passing the calcinator, flows via a cyclone preheater into the rotary kiln. Guiding of the exhaust gases of the rotary kiln into a reactor, which is arranged between rotary kiln and calcinator, is proposed according to the invention, wherein superstoichiometric fuel is fed into the reactor in relation to the dwell time of the exhaust gases in the reactor, so that carbon dioxide ($CO_2$) contained in the exhaust gases is reduced to form carbon monoxide (CO).

According to the idea of the invention, the exhaust gas of the rotary kiln of a plant for producing cement is no longer, as is typical in the prior art, guided directly into the calcinator, where it entrains raw meal and deacidifies the raw meal at the same time and wherein simultaneously the nitrogen oxide (NOx) contained in the exhaust gas is reduced by carbon monoxide (CO) formed in the calcinator in a staged combustion. Rather, it is provided that raw meal from the calcinator is still supplied through a raw meal line from the lowermost cyclone preheating stage of a preheating stage to the rotary kiln. According to the idea of the invention, it is provided that the exhaust gas from the rotary kiln intake chamber firstly flows through a channel or pipeline, which is intended separately for the exhaust gas, into a reactor, before the exhaust gas is conducted into the calcinator to deacidify the raw meal. In this reactor, which is advantageously located higher than a rotary kiln intake chamber, which is arranged between rotary kiln and calcinator base, fuel is added superstoichiometrically in relation to the Boudouard reaction and the carbon dioxide ($CO_2$) concentration present in the rotary kiln exhaust gases. The essential reaction in the reactor is not determined, for example, by the combustion of the fuel by residual oxygen in the rotary kiln exhaust gases, but rather by an endothermic Boudouard reaction. In this case, the carbon dioxide ($CO_2$), which is contained by up to 25% in the exhaust gas, is reacted with the carbon (C) of the fuel to form carbon monoxide (CO). The fuel is thus oxidized in the heat by the carbon dioxide ($CO_2$), wherein the carbon (C) from the fuel is oxidized to form carbon monoxide (CO) and the carbon dioxide ($CO_2$) is also itself reduced to form carbon monoxide (CO) during the oxidation of the fuel. This reaction pathway of the known Boudouard reaction is endothermic. Since the temperature of the rotary kiln exhaust gases is very high, this temperature reduction due to the heat absorption in the endothermic reaction is very welcome, since the reaction constant of the conversion of carbon dioxide ($CO_2$) to carbon monoxide (CO) at a lower temperature than the rotary kiln exhaust gases display is pronounced in favor of an increased carbon monoxide (CO) occurrence. The advantage of the conversion, which is separated in a reactor, of the carbon dioxide ($CO_2$) contained in the rotary kiln exhaust gases is the better reaction control in comparison to the simultaneous reaction of deacidification of the raw meal, reduction of carbon dioxide ($CO_2$) to carbon monoxide (CO), and the reduction of nitrogen oxides (NOx) to form elementary nitrogen ($N_2$) and oxygen ($O_2$) by the carbon monoxide (CO) formed.

Since the Boudouard reaction runs in an endothermic manner and therefore counteracts the temperature of the exhaust gases of the rotary kiln, the temperature in the reactor can be controlled or even regulated by the addition of fuel, to avoid an undesired increase of the temperature in the reactor, during which undesired further nitrogen oxides (NOx) could arise from the added fuel. According to one embodiment of the invention, control of the temperature in the reactor by addition of superstoichiometric fuel is thus provided, wherein the temperature in the reactor is reduced by the Boudouard reaction during the endothermic reduction of carbon dioxide ($CO_2$) with carbon (C) from the fuel to form carbon monoxide (CO). Since it is known that the denitrification is catalyzed in the presence of calcium oxide (CaO), it is provided in one embodiment of the invention that a specific quantity of deacidified raw meal is always supplied to the reactor, in order to catalytically assist the denitrification occurring in the reactor. The supply of the deacidified raw meal can be entrained by raw meal swirled up in the rotary kiln with the exhaust gases. The exhaust gas guiding of the exhaust gases from the rotary kiln can thus be provided so that the swirled-up raw meal enters the reactor and is not filtered out by cyclone traps. Alternatively or additionally, it can also be provided that freshly deacidified raw meal is supplied to the reactor from the lowermost or second-lowermost cyclone preheating stage.

Since, after the desired reduction of nitrogen oxides (NOx) with carbon monoxide (CO) provided in excess, remaining carbon monoxide (CO) is still present in the exhaust gas of the reactor, it is proposed according to a further embodiment of the invention that tertiary air be supplied to the calcinator, which has approximately 18 volume-% oxygen (O2) as atmospheric air which was heated in the clinker cooler. This atmospheric oxygen (O2) can be used in the calcinator for the oxidation, which runs in an exothermic manner, of the remaining carbon monoxide (CO). Due to the exothermic combustion of the carbon monoxide in the calcinator, which runs at a lower temperature than the combustion of air nitrogen to form nitrogen oxides (NOx), the required heat for the deacidification reaction, which runs in an endothermic manner, is supplied to the calcinator. In one embodiment of the invention, the guiding of the exhaust gases of the reactor into the calcinator is thus provided, wherein excess carbon monoxide (CO) is oxidized in the calcinator by air oxygen (O2) from a tertiary air line, which supplies the calcinator with preheated air.

The correct dimensioning of the reactor is advantageous for ideal combustion control. Even if a flap system can control the air quantity flow guided through the reactor, in an advantageous embodiment of the invention, a dimensioning of the reactor is provided, which is sufficiently large that the exhaust gases originating from the rotary kiln, which contain nitrogen oxides (NOx), are reduced by the carbon monoxide (CO) formed. The reactor is thus sufficiently large that during normal operation, the exhaust gas entering the reactor from the rotary kiln dwells therein until the nitrogen oxides (NOx) contained in the exhaust gas from the rotary kiln are completely reduced if possible. In the dimensioning, a little (NOx) is not necessarily avoidable, but the low concentration of the nitrogen oxides (NOx) is further reduced in the calcinator section, which follows the reactor.

The possibility of a combustion of fuel in the rotary kiln with a high air oxygen excess is advantageous in the method according to the invention. A complex solid-state reaction in the heat occurs in the rotary kiln, which requires an oxidative environment for the production from a mixture of calcium silicate phases of differing stoichiometry. Furthermore, it is possible by way of the combustion with high air oxygen excess to also use poorly burning fuels as the primary fuel, for example, petcoke.

To control or regulate the dwell time of the exhaust gases in the reactor, according to one embodiment of the invention, a control or regulation of the exhaust gas quantity in the reactor by way of a flap system in the feed lines from the rotary kiln to the reactor and in the tertiary air line is provided, wherein the regulating unit allocates the total air quantity, which originates from a clinker cooler connected downstream from the rotary kiln, so that the dwell time of the exhaust gas from the rotary kiln in the reactor is sufficiently long that a maximum possible reduction of nitrogen oxides (NOx) occurs in the reactor. By way of the optional reduction of the secondary air stream from the rotary kiln in favor of the tertiary air stream, the dwell time of the exhaust gas in the reactor can thus be increased, to subject the nitrogen oxides (NOx) contained in the exhaust gas from the rotary kiln to a longer action time of the carbon monoxide concentration in the reactor.

In the case of irregularly burning fuel or due to fluctuations of the operating parameters, sudden overheating in the reactor can occur in spite of temperature control in the reactor by the fuel supply. In the case of this overheating, nitrogen oxides (NOx) occur, instead of being reduced. To avoid such short-term nitrogen oxide emissions (emission of NOx) from the reactor, it is provided according to one embodiment of the invention that raw meal from the mixture mentioned at the outset, made of calcareous rock and silicate-containing rock, is blown into the reaction chamber of the reactor. Cold raw meal which has not yet been deacidified can optionally be used in this case, if the overheating is very sudden and strong, or raw meal which is already partially deacidified or preheated can be used, if a sudden overheating is not excessively strong. In one advantageous embodiment of the invention, cooling of undesired high temperature peaks in the reactor by introduction of raw meal is thus provided, wherein excess raw meal from the reactor is discharged through a discharge into a rotary kiln intake chamber, which is arranged between rotary kiln and calcinator. The discharge of the raw meal into the rotary kiln intake chamber prevents the reactor from clogging. The raw meal is then deacidified and sintered to form clinker in the rotary kiln.

If the supplied fuel burns very poorly or forms slag, the fuel residues, which possibly sink down as a solid in the reactor, can also be discharged, through the same line as the raw meal residues for cooling the reactor, into the rotary kiln intake chamber. In an advantageous embodiment of the invention, the discharge of excess fuel into a rotary kiln intake chamber, which is arranged between rotary kiln and calcinator, is thus provided.

A pot reactor, which accommodates the requirement for the dwell time of the exhaust gas to be expected from the rotary kiln by way of a corresponding volume, is suitable for carrying out the method according to the invention, or it is also possible to use a gooseneck reactor, which is arranged as a burnout reactor between calcinator and rotary kiln and is constructed in an inverted U-shape.

BRIEF DESCRIPTION OF THE DRAWINGS

The invention will be explained in greater detail on the basis of the following figures.

In the figures:

The FIGURE shows a plant according to the invention for producing cement clinker.

DETAILED DESCRIPTION OF THE PREFERRED EMBODIMENTS

The FIGURE shows a plant 1 for producing cement clinker from raw meal 2 having, viewed in the material flow direction, at least one calcinator 3 for deacidifying the raw meal 2, and at least one rotary kiln 4 for sintering the deacidified raw meal 2 to form cement clinker 5, wherein the deacidified raw meal 2, after passing the calcinator 3, flows via a cyclone preheating stage 1.4 into the rotary kiln 4. Beginning with the delivery of the raw meal 2 into the heat exchanger 1.1, where the raw meal 2 is preheated for the subsequent deacidification, the heated raw meal flows from the second-lowermost cyclone preheating stage 1.2 via a line 1.3 into the base of the calcinator 3. The raw meal 2 is entrained therein by the hot exhaust gases 9, which originate from the reactor 7, and deacidified in the heat of the exhaust gases 9 in the calcinator. The CO2 occurring in this case is discharged via the heat exchanger 1.1. The deacidified raw meal 2, in contrast, is separated in the lowermost cyclone preheating stage 1.4 and introduced via a separate line 1.5 into the rotary kiln intake chamber 16, where it then flows into the rotary kiln 4 for further thermal treatment. The exhaust gas 6 occurring in the rotary kiln 4 due to the combustion of fuel is conducted via a separate exhaust gas line 13 provided for this purpose into a reactor 7, where the exhaust gas 6 firstly dwells and is subjected to a Boudouard reaction with the addition of superstoichiometric fuel 8. In this case, carbon dioxide (CO2) from the combustion in the rotary kiln 4 is chemically reduced together with the carbon (C) of the fuel 8 to form carbon monoxide (CO). This Boudouard reaction may be thermally controlled by the added quantity of fuel 8, since the Boudouard reaction reacts with cooling upon increasing fuel supply. The denitrification occurring following the carbon monoxide occurrence in the reactor 7 advantageously occurs substantially in the reactor 7. The exhaust gases 9 exiting from the reactor 7 are then conducted via a separate feed line 9.1 into the calcinator 3, to deacidify the raw meal 2 by way of the heat contained in the exhaust gas 9 of the reactor 7. In order to control the optional combustion of further fuel in the calcinator 3 in relation to the nitrogen oxide production, in addition to the exhaust gas from the reactor, tertiary air 11 is supplied via a tertiary air line 10 to the calcinator 3. The high carbon monoxide concentration in the exhaust gas 9 of the reactor 7 ensures a chemical reduction of the nitrogen oxide occurring in the calcinator 3. To control the gas quantities which flow into the calcinator 3 and into the reactor 7, a flap system 12 is provided, which allocates the gas quantity originating from the clinker cooler 14, in the form of secondary air, which flows through the rotary kiln 4, and in the form of tertiary air 11, which flows through the tertiary air line 10, into various partial flow quantities per unit of time. The exhaust gas quantity supplied to the reactor 7 can thus be monitored, so that the exhaust gas composition of the exhaust gas 9 from reactor 7 has a predetermined composition. The idea of the invention is intended to not guide the exhaust gas 6 of the rotary kiln 4 directly via the rotary kiln intake chamber 16 into the calcinator 3, where the high nitrogen oxide concentration of the exhaust gas 6 must be reduced in the short calcinator section, but rather it is provided that the carbon dioxide (CO2) in the exhaust gas 6 from the rotary kiln 4 is firstly reduced in a reactor 7 to form carbon monoxide (CO), wherein sufficient carbon monoxide (CO) is generated in the reactor 7 by a Boudouard reaction that the high nitrogen oxide concentration in the exhaust gas 6 of the rotary kiln 4 is substantially chemically reduced in the reactor. Only then are the exhaust gases 9 conducted into the calcinator 3, where the excess carbon monoxide (CO) is used as a fuel gas for generating the heat for deacidifying the raw meal (2). To catalytically assist the reaction in the reactor 7 using calcium oxide (CaO), pre-deacidified raw meal can be conducted through a raw meal line 17 from the second-lowermost cyclone preheating stage 1.2 into the reactor 7.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 plant
1.1 heat exchanger
2 raw meal
3 calcinator
4 rotary kiln
5 cement clinker
6 exhaust gas
7 reactor
8 fuel
9 exhaust gases
9.1 feed line
10 tertiary air line
11 fuel
12 flap system
13 exhaust gas line
14 clinker cooler
15 discharge
16 rotary kiln intake chamber
17 raw meal line

The invention claimed is:

1. A method for operating a plant for producing cement clinker from raw meal having, viewed in the material flow direction, at least one calcinator for deacidifying the raw meal, and at least one rotary kiln for sintering the deacidified raw meal to form cement clinker, comprising the steps:

flowing the deacidified raw meal, after passing the calcinator, via a cyclone preheating stage into the rotary kiln, guiding exhaust gases of the rotary kiln into a reactor, which is arranged between the rotary kiln and calcinator, wherein superstoichiometric fuel is fed into the reactor in relation to the dwell time of the exhaust gases in the reactor, so that carbon dioxide contained in the exhaust gases is reduced to form carbon monoxide, and the guiding of the exhaust gases from the rotary kiln being provided in such a way that fluidized raw meal goes into the reactor and is not filtered out by cyclone traps, controlling the temperature in the reactor by addition of superstoichiometric fuel, wherein the temperature in the reactor is reduced by the Boudouard reaction during the endothermic reduction of carbon dioxide with carbon from the fuel to form carbon monoxide, and, regulating the exhaust gas quantity in the reactor by way of a flap system in the feed lines from the rotary kiln to the reactor and in a tertiary air line, wherein the regulating unit allocates a total air quantity, which originates from a clinker cooler connected downstream from the rotary kiln, so that the dwell time of the exhaust gas from the rotary kiln is sufficiently large that a maximum possible reduction of nitrogen oxides in the reactor occurs.

2. The method as claimed in claim 1, including a step of guiding the exhaust gases of the reactor into the calcinator, wherein excess carbon monoxide is oxidized in the calcinator by air oxygen from a tertiary air line, which supplies the calcinator with preheated air.

3. The method as claimed in claim 1, including a step of dimensioning the reactor so that it is sufficiently large that the exhaust gases originating from the rotary kiln, which contain nitrogen oxides, are reduced by the carbon monoxide formed.

4. The method as claimed in claim 1, further including the step of combusting fuel in the rotary kiln with air to provide an oxygen excess.

5. The method as claimed in claim 1, including a step of cooling the reactor to reduce undesired high temperature peaks in the reactor by introduction of raw meal, wherein excess raw meal from the reactor is discharged through a discharge into a rotary kiln intake chamber, which is arranged between the rotary kiln and the calcinator.

6. The method as claimed in claim 1, including a step of discharging at least one of excess fuel and excess raw meal from the reactor into a rotary kiln intake chamber, which is arranged between the rotary kiln and the calcinator.

7. The method as claimed in claim 1, wherein the reactor is a pot reactor or a gooseneck reactor, which is constructed in an inverted U-shape.

\* \* \* \* \*